(12) United States Patent      (10) Patent No.:   US 12,629,969 B2

Song et al.                 (45) Date of Patent:     May 19, 2026

(54) PIEZOELECTRIC DIRECT CURRENT GENERATOR

(71) Applicant: KOREA INSTITUTE OF SCIENCE AND TECHNOLOGY, Seoul (KR)

(72) Inventors: Hyun Cheol Song, Seoul (KR); Chong Yun Kang, Seoul (KR); Sung Hoon Hur, Seoul (KR); Seung Hyub Baek, Seoul (KR); Seong Keun Kim, Seoul (KR); Ji Won Choi, Seoul (KR); Jung Ho Yoon, Seoul (KR); Hyun Soo Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 946 days.

(21) Appl. No.: 17/889,876

(22) Filed: Aug. 17, 2022

(65) Prior Publication Data

US 2023/0058826 A1      Feb. 23, 2023

(30) Foreign Application Priority Data

Aug. 19, 2021    (KR) ........................ 10-2021-0109428

(51) Int. Cl.
     *H02N 2/18*        (2006.01)
     *B60C 23/04*      (2006.01)

(52) U.S. Cl.
     CPC ......... *B60C 23/0411* (2013.01); *H02N 2/181* (2013.01)

(58) Field of Classification Search
     CPC .... H10N 30/30; H10N 30/302; H10N 30/304;
               H10N 30/306; H10N 30/308; H02N 2/18;
               H02N 2/181; H02N 2/183; H02N 2/185;
                   H02N 2/186; H02N 2/188
     USPC ......................................................... 310/339
     See application file for complete search history.

(56) References Cited

U.S. PATENT DOCUMENTS

2011/0204317 A1*   8/2011   Park ................... H10F 77/1437
                                         977/762

FOREIGN PATENT DOCUMENTS

KR     10-2010-0019297 A     2/2010
KR     10-2011-0095659 A     8/2011

OTHER PUBLICATIONS

Yoonjung Lee et al., "Direct-current flexible piezoelectric nanogenerators based on two-dimensional ZnO nanosheet", Applied Surface Science 509 (2020), Jan. 12, 2020.

* cited by examiner

*Primary Examiner* — Derek J Rosenau

(57)             ABSTRACT

Provided is an apparatus for generating direct current using continuous polarization change of piezoelectric materials. For example, a piezoelectric direct current generator includes a first electrode, a polarized piezoelectric material layer disposed on a first surface of the first electrode, and a second electrode disposed on a surface opposite to the first electrode and coupled to move along the piezoelectric material layer while pressing the piezoelectric material layer.

13 Claims, 11 Drawing Sheets

100

130

120

110 i

130

120

110

PIEZOELECTRIC DIRECT CURRENT GENERATOR

CROSS REFERENCE TO RELATED APPLICATIONS

This application claims priority under 35 U.S.C. § 119 to Korean Patent Application No. 10-2021-0109428, filed on Aug. 19, 2021, in the Korean Intellectual Property Office, the disclosures of which are incorporated by reference herein in their entireties.

BACKGROUND

1. Field

Embodiments relate to a principle and apparatus for generating direct current using the continuous polarization change of piezoelectric materials.

2. Description of the Related Art

Since alternating current is more efficient for long-distance transmission than direct current after the industrial revolution, a generator has been developed only in the form of an alternating current generator that generates electricity from mechanical rotation using electromagnetic induction. However, since alternating current (AC) has to be converted into direct current (DC) so as to drive an electronic device or charge a battery, a lot of output loss occurs in the process of the conversion through a rectifier circuit. Thus, in the case of small-scale or micro-energy power generation, it is more efficient to directly generate and use the direct current. However, there are few studies on efficient DC generators that are capable of directly generating the direct current from mechanical energy such as rotational motion.

Recently, as entering the era of the 4th industrial revolution, demands for energy harvesting technologies to drive an IoT sensor are greatly increasing, and also, demands for development of an independent power source capable of small-scale on-site generation is also greatly increasing. In addition, the DC grids system is more efficient in small areas. Therefore, in the small-scale/micro-energy power generation, the development of the DC generator is greatly required so as to be improved in usability and efficiency.

SUMMARY

An aspect of the present disclosure provides a piezoelectric direct current generator capable of directly generating direct current from mechanical energy using the continuous polarization change of piezoelectric materials.

The technical problems to be achieved in this patent are not limited to the above-mentioned technical problems (ultrasound frequency band), and other technical problems that are not mentioned will be clearly understood by those of ordinary skill in the technical field to which the present invention belongs from the following description.

According to at least one of embodiments, a piezoelectric direct current generator includes: a first electrode; a polarized piezoelectric material layer disposed on a first surface of the first electrode; and a second electrode disposed on a surface opposite to the first electrode and coupled to move along the piezoelectric material layer while pressing the piezoelectric material layer.

The second electrode may be provided to have an area less than that of the piezoelectric material layer.

At least a partial area of the second electrode may be disposed to be in contact with the piezoelectric material layer.

The piezoelectric direct current generator may further include an abrasion-resistant layer disposed between the piezoelectric material layer and the second electrode.

The second electrode may be provided in plurality.

Each of the second electrodes may be configured to move while pressing different areas of the piezoelectric material layer.

Each of the second electrodes may be configured to rotate on a top surface of the piezoelectric material layer with respect to an axis that is defined in a direction perpendicular to the top surface of the piezoelectric material layer.

The second electrode may include a rotating part including a plurality of wheels arranged in a preset angle with respect to the axis.

The piezoelectric direct current generator may further include a ring-shaped edge part coupled to an edge of the rotating part.

The plurality of wheels of the rotating part may rotate along the top surface at the same angular velocity.

BRIEF DESCRIPTION OF THE DRAWINGS

The following drawings attached in this specification illustrate a preferred embodiment of the present invention and function to make further understood the technical spirit of the present invention along with the Inventor the invention, and thus, the present invention should not be construed as being limited to only the drawings. In the drawings.

DETAILED DESCRIPTION

Figure 1:
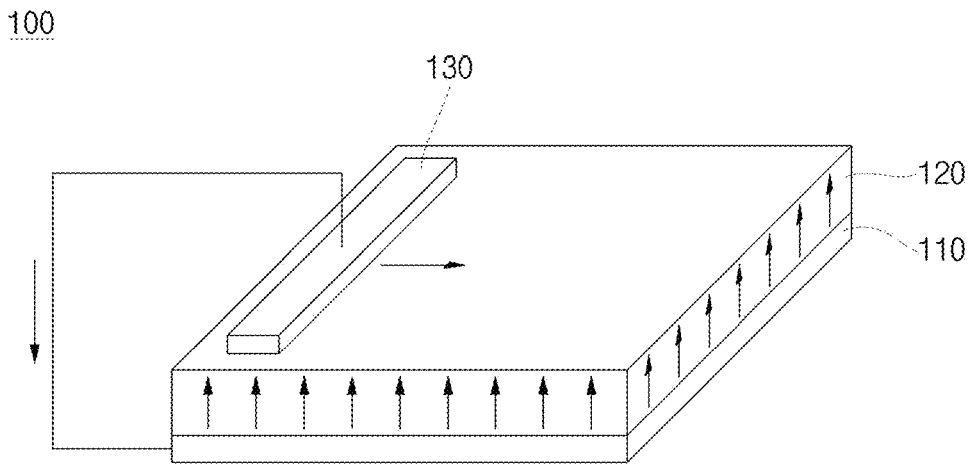
FIG. 1 is a schematic perspective view of a piezoelectric direct current generator according to an embodiment.

The objects, other objectives, features, and advantages of the inventive concept will be understood without difficulties through preferred embodiments below related to the accompanying drawings. The present disclosure may, however, be embodied in different forms and should not be construed as limited to the embodiments set forth herein. Rather, these embodiments are provided so that this disclosure will be thorough and complete, and will fully convey the scope of the inventive concept to those skilled in the art.

In this specification, it will also be understood that when another component is referred to as being 'on' one component, it can be directly on the one component, or an intervening third component may also be present. Also, in the figures, the dimensions of layers and regions are exaggerated for clarity of illustration.

The embodiment in the detailed description will be described with cross-sectional views and/or plan views as ideal exemplary views of the inventive concept. In the figures, the dimensions of layers and regions are exaggerated for clarity of illustration. Thus, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes. For example, an area illustrated as a rectangle may be rounded or have a shape with a predetermine curvature. Thus, areas exemplified in the drawings have general properties and are used to illustrate a specific shape of a device. Thus, this should not be construed as limited to the scope of the inventive concept. Also, though terms like a first and a second are used to describe various regions and layers in various embodiments of the inventive concept, the regions and the layers are not limited to these terms. These terms are only used to distinguish one component from another component. Embodiments described and exemplified herein include complementary embodiments thereof.

In the following description, the technical terms are used only for explaining a specific exemplary embodiment while not limiting the present invention. In this specification, the terms of a singular form may comprise plural forms unless specifically mentioned. The meaning of 'comprises' and/or 'comprising' does not exclude other components besides a mentioned component.

In description of following specific embodiments, various specific contents give further detailed description to help understanding of the prevent device. However, a person of ordinary skill in the art will understand the present Inventor practiced without employing these specific details. In some cases, it is mentioned in advance that portions that are commonly known and not significantly related to the invention are not described in order to prevent confusion without any reason in describing the present invention.

Hereinafter, a configuration, function, and operation mechanism of a generator that is capable of directly generating direct current from mechanical energy without a rectifier circuit, as a direct current (DC) generator using a piezoelectric effect according to an embodiment, by allowing a movable upper electrode having a certain area on a polarized piezoelectric material, from which an electrode disposed on one surface thereof is removed, to move while applying a certain pressure will be described.

FIG. 1 is a perspective view of a direct current generating apparatus using a piezoelectric effect according to an embodiment.

As illustrated in FIG. 1, a piezoelectric direct current generator 100 according to an embodiment may include a lower electrode 110, a polarized piezoelectric material layer 120 disposed on the lower electrode 110, and an upper electrode movably disposed on the piezoelectric material layer 120.

For example, the lower electrode 110 may be coupled to the piezoelectric material layer 120 to be applied to a front surface thereof. The piezoelectric material layer 120 may be provided in a rectangular plate shape having a predetermined thickness or may be provided in a circular shape for generating power through rotational motion. The upper electrode 130 may be separated from the piezoelectric material layer 120 and be disposed above the piezoelectric material layer 120 to move while sweeping in all direction, i.e., forward, backward, left, and right directions along the top surface of the piezoelectric material layer 120. For this, the upper electrode 130 may have a size less than that of each of the lower electrode 110 and the piezoelectric material layer 120. The upper electrode 130 may move while applying a constant pressure in a thickness direction of the piezoelectric material layer 120 to generate electromotive force in the piezoelectric material layer 120. Also, the lower electrode 110 and the upper electrode 130 may be electrically connected to each other.

Although an example, in which the upper electrode 130 is disposed at an upper side, is illustrated in FIG. 1, the upper electrode 130 may be disposed at a lower side according to an installed position of the generating apparatus. That is, the terms of the upper electrode 130 and the lower electrode 110 are only a name for describing a relative position with respect to the direction of the drawing for convenience, but do not limit an absolute positional relationship.

The lower electrode 110 is disposed parallel to the piezoelectric material layer 120 and may be physically or chemically coupled to the piezoelectric material layer. The lower electrode 110 may be provided as an Ag electrode, which is a type of conductive layer. The lower electrode 110 may be replaced with another metal or metal oxide if another metal or metal oxide serves as an electrode.

The piezoelectric material layer 120 is disposed parallel to an upper portion of the lower electrode 110 and has polarization characteristics in a vertical direction through a polling process of applying a high electric field (about 3.5 kV/mm) at a high temperature (about 120 degrees or less). For the poling process, only one side of the electrode applied to both sides of the piezoelectric material layer 120 may be removed after the poling process is completed. In addition, the piezoelectric material layer 120 to which the electrode is applied to only one surface may be polarized using a corona poling method. The corona poling method is a method for forming the polarization in the piezoelectric material layer 120 by applying a high electric field (about 1 kV to several kV) in a state where only the electrode on one side is in contact with the piezoelectric material layer 120, and the other side is separated from the piezoelectric material layer 120 without being contact with the piezoelectric material layer 120. When using this method, it is possible to avoid the trouble of removing the electrode on one surface after the polling process.

The piezoelectric material layer 120 may have a size that is equal to or less than that of the lower electrode.

The piezoelectric material layer 120 may be made of piezoelectric ceramic having a Pb-based perovskite structure, and the piezoelectric material layer 120 serves to generate electromotive force from mechanical energy.

The piezoelectric ceramic having the Pb-based perovskite structure may be a composition with a large piezoelectric characteristic of a single, binary, or ternary system such as PbTiO$_3$, PZT [Pb(Zr, Ti)O$_3$], PMN—PT [Pb(Mg$_{1/3}$Nb$_{2/3}$)O$_3$—PbTiO$_3$)], PZN—PT [Pb(Zr$_{1/3}$Nb$_{2/3}$) O$_3$—PbTiO$_3$)], PMN—PZT [Pb(Mg$_{1/3}$Nb$_{2/3}$)O$_3$—Pb(Zr,Ti)O$_3$], PNN—PZT [Pb(Ni$_{1/3}$Nb$_{2/3}$)O$_3$—Pb(Zr,Ti)O$_3$], PZN—PZT [Pb(Zr$_{1/3}$Nb$_{2/3}$)O$_3$—Pb(Zr,Ti)O$_3$].

In addition to the Pb-based piezoelectric ceramics having the perovskite structure, various piezoelectric materials such as lead-free piezoelectric ceramics such as NKN[(Na, K)NbO$_3$] and BaTiO$_3$and piezoelectric polymers such as PVDF (polyvinylidene fluoride), P(VDF-TrFE) [poly(vinylidene) fluoride-trifluoroethylene)] may be used as the material of the piezoelectric material layer 120.

The piezoelectric ceramic may have a crystal grain structure in the form of polycrystals, single crystals, or templated grain growth (TGG). The piezoelectric ceramic having the templated grain growth structure refers to a polycrystal grown by aligning grains in one direction like the single crystal so as to improve characteristic values.

The upper electrode 130 is disposed parallel to an upper portion of the piezoelectric material layer 120 and is separated from the piezoelectric material layer 120. The upper electrode 130 may have a size less than that of the piezoelectric material layer 120. Therefore, the upper electrode 130 may move to left and right sides on the piezoelectric material layer. When the upper electrode 130 moves, it may be preferable to apply a constant pressure to the piezoelectric material layer 120 so as to generate the electromotive force in the piezoelectric material layer 120. In addition, as will be described later, the upper electrode 130 may be provided in the form that is rotatable as well as movable to the left and right sides (see FIG. 9). The upper electrode 130 may be provided as an indium tin oxide (ITO) electrode, which is a type of a conductive layer. In addition, if the lower electrode 110 may also serve as an electrode, the material of the lower electrode 110 may be replaced with another metal or metal oxide.

In addition, an electrically conductive abrasion-resistant layer (not shown) for preventing abrasion may be separately provided between the upper electrode 130 and the piezoelectric material layer 120. Since the output of the direct current generator is proportional to an area that the upper electrode 130 sweeps over the upper portion of the piezoelectric material layer 20, it is preferable to have a shape that is elongated in a direction perpendicular to the direction in which the upper electrode 130 moves.

Also, the upper electrode and the lower electrode may be connected to each other through an electric wire (see FIG. 1). The piezoelectric direct current generator is configured to include a conduction device through which direct current passes through electromotive force between the electric wire or the upper/lower electrodes. FIGS. 2A to 2F are schematic views sequentially illustrating an operation mechanism of the piezoelectric direct current generator of FIG. 1.

Figure 2A:
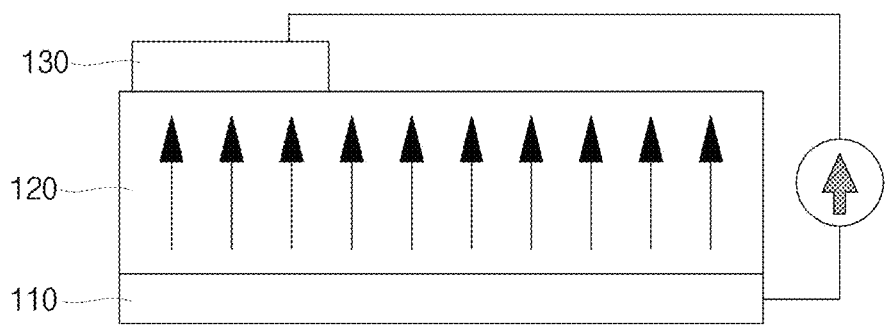
FIGS. 2A to 2F are schematic views sequentially illustrating an operation mechanism of the piezoelectric direct current generator of FIG. 1.
Figure 2B:
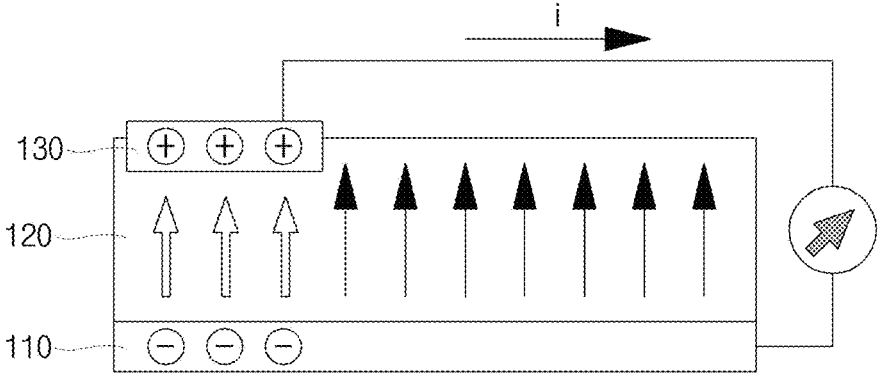

First, referring to FIGS. 2A to 2B, the upper electrode 130 moves while applying a constant pressure to the top surface of the piezoelectric material layer 120 having the polarization, on which the electrode on the one surface is removed.

Figure 2C:
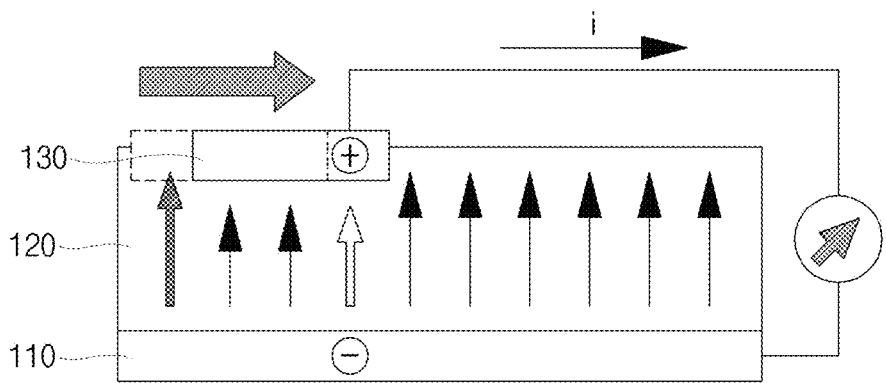
Figure 2D:
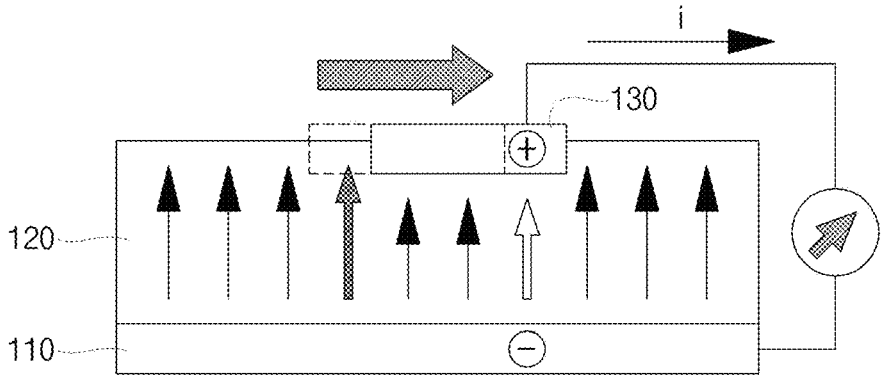

In addition, referring to FIGS. 2C and 2D, electromotive force −ΔP' that is released while the upper electrode 130 moves does not have an effect as it passes through the electrode, and thus, free electrons of the electrode is effected by only electromotive force ΔP' that is newly generated by the movement. As a result, the current flows only in one direction from the upper electrode to the lower electrode. In addition, due to this principle, DC electricity is generated from the mechanical motion.

Figure 2E:
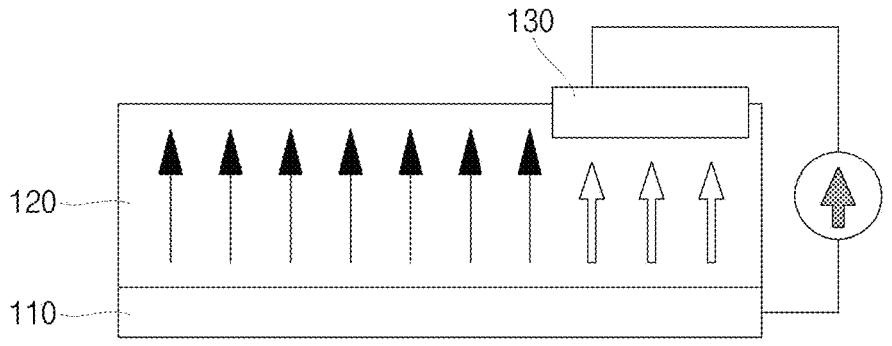
Figure 2F:
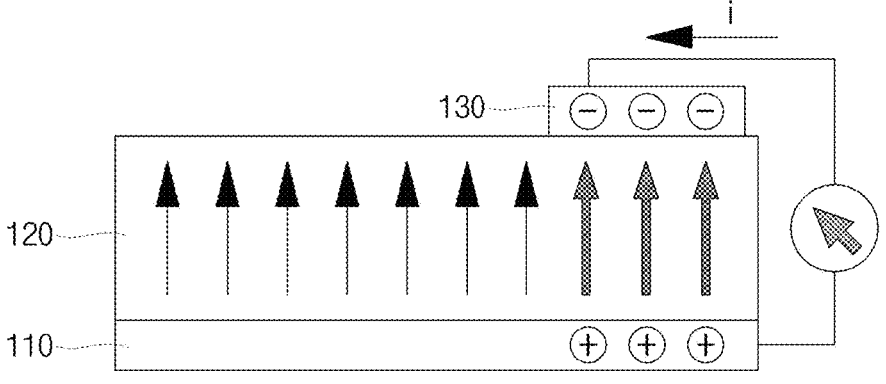

As illustrated in FIG. 2E, when the movement of the upper electrode 130 is stopped, the current does not flow because there is no newly generated electromotive force. Then, as illustrated in FIG. 2F, when a pressure applied to the upper electrode 130 is released, the current flows in the opposite direction by the electromotive force −ΔP generated while the piezoelectric material layer 120 is released to its original position.

Figure 3:
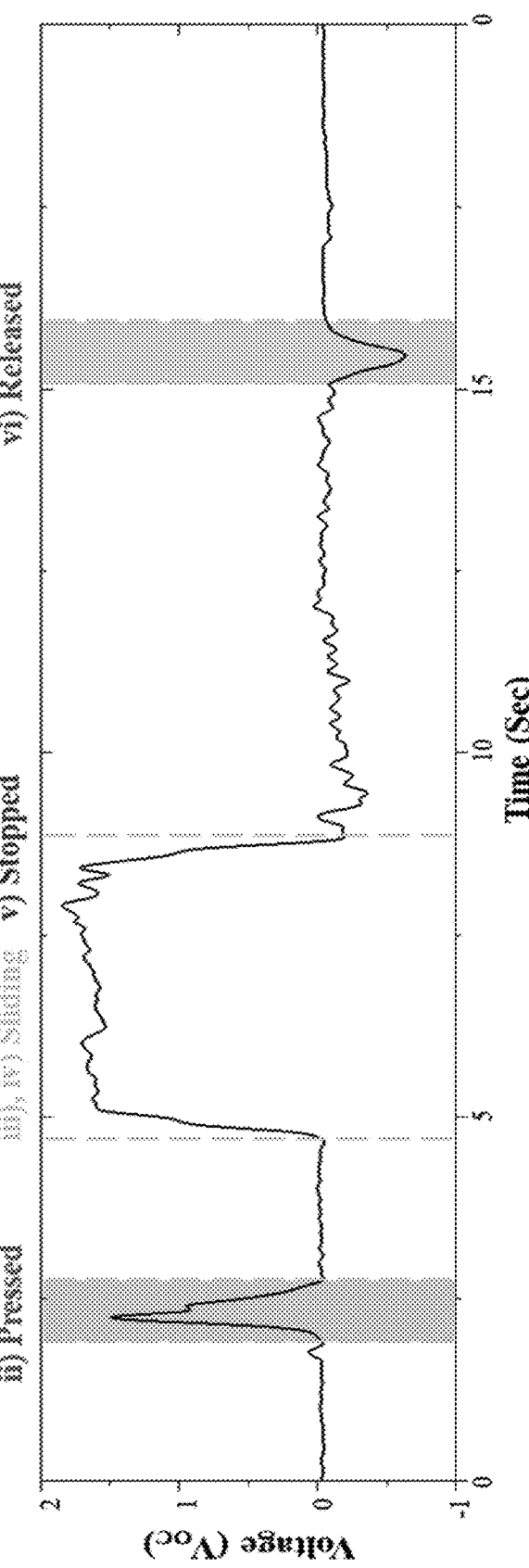
FIG. 3 is a graph illustrating an experimental result corresponding to the operation mechanism of FIGS. 2A to 2F.

FIG. 3 is a graph illustrating an experimental result corresponding to the operation mechanism of FIGS. 2A to 2F.

Referring to FIG. 3, it may be confirmed that the operation principle of the piezoelectric direct current generator 100 according to an embodiment is consistent with the experimental result. For example, in the graph of FIG. 3, it may be seen that a positive voltage is generated when the upper electrode 130 presses the piezoelectric material layer 120 or moves in the state of pressing the piezoelectric material layer 120. Also, in FIG. 3, it may be seen that a negative voltage is generated when the pressure is released after the movement of the upper electrode 130 is stopped.

Figure 4:
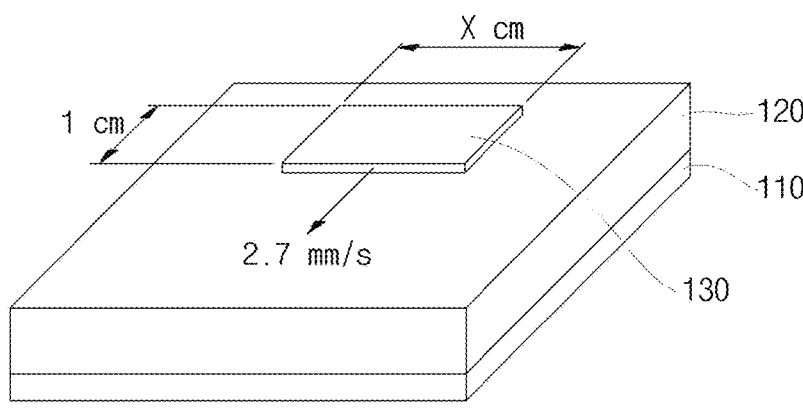
FIG. 4 is a perspective view and a table of experimental conditions, which briefly illustrate an operation embodiment depending on a change in length of an upper electrode in the piezoelectric direct current generator of FIG. 1.
Figure 5A:
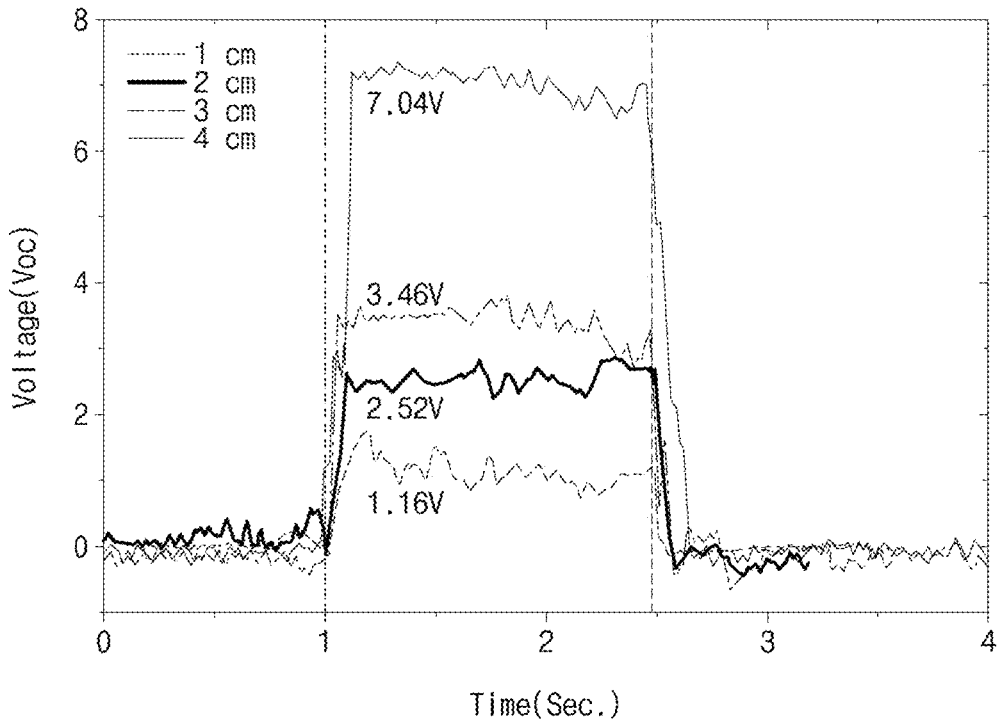
FIG. 5A is a graph illustrating a change in time-varying output voltage depending on the change in length of the upper electrode of FIG. 4.
Figure 5B:
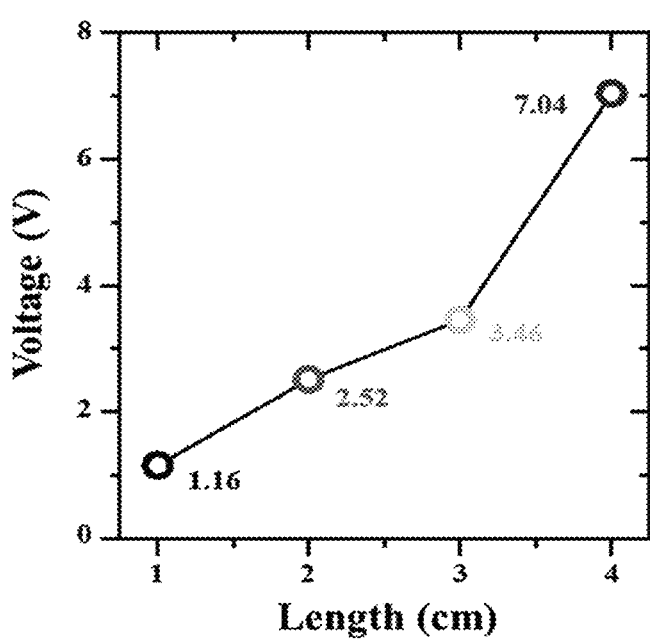
FIG. 5B is a graph illustrating a change in output voltage depending on the change in length of the upper electrode of FIG. 4.

FIG. 4 is a perspective view and a table of experimental conditions, which briefly illustrate an operation embodiment depending on a change in length of the upper electrode in the piezoelectric direct current generator of FIG. 1. FIG. 5A is a graph illustrating a change in time-varying output voltage depending on the change in length of the upper electrode of FIG. 4. FIG. 5B is a graph illustrating a change in output voltage depending on the change in length of the upper electrode of FIG. 4.

FIG. 4 illustrates an experimental process, in which a piezoelectric material layer 120 made of PZT having a thickness of about 200 μm is formed on the lower electrode 110 defining a front surface using Ag, and an upper electrode made of Al with a width of about 1 cm is swept on the piezoelectric material layer 120 at a speed of about 2.7 cm/s while applying a pressure of about 20 N to the upper electrode 130. Here, a voltage obtained according to a length X of the upper electrode 130 is compared.

Referring to FIG. 5A, it may be confirmed that the DC voltage is generated regardless of a change in length x of the upper electrode 130.

In addition, referring to FIGS. 5A and 5B, it may be seen that the longer the length x of the upper electrode 130, the higher the voltage is induced. In addition, it may be seen that magnitude of the output voltage increases almost in proportion to the length x of the upper electrode. In other words, it may be seen that the larger an area swept by the upper electrode 130, the greater the output is generated. (The greater the area swept by the upper electrode, the greater the induced electromotive force ΔP', resulting in a greater output voltage)

Figure 6:
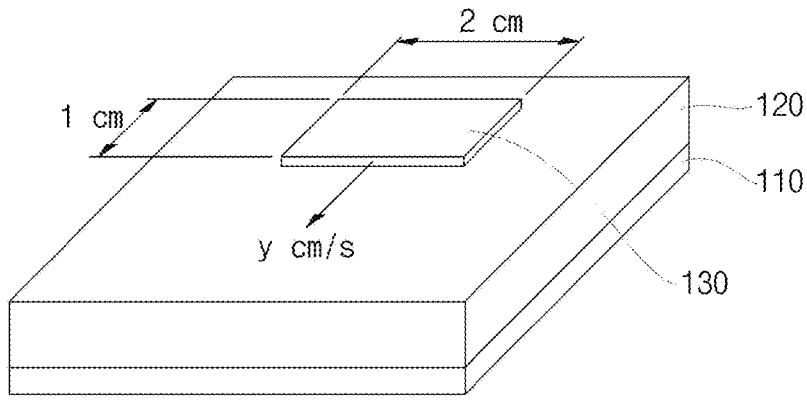
FIG. 6 is a perspective view and a table of experimental conditions, which briefly illustrate an operation embodiment depending on a moving speed of the upper electrode in the piezoelectric direct current generator of FIG. 1.
Figure 7A:
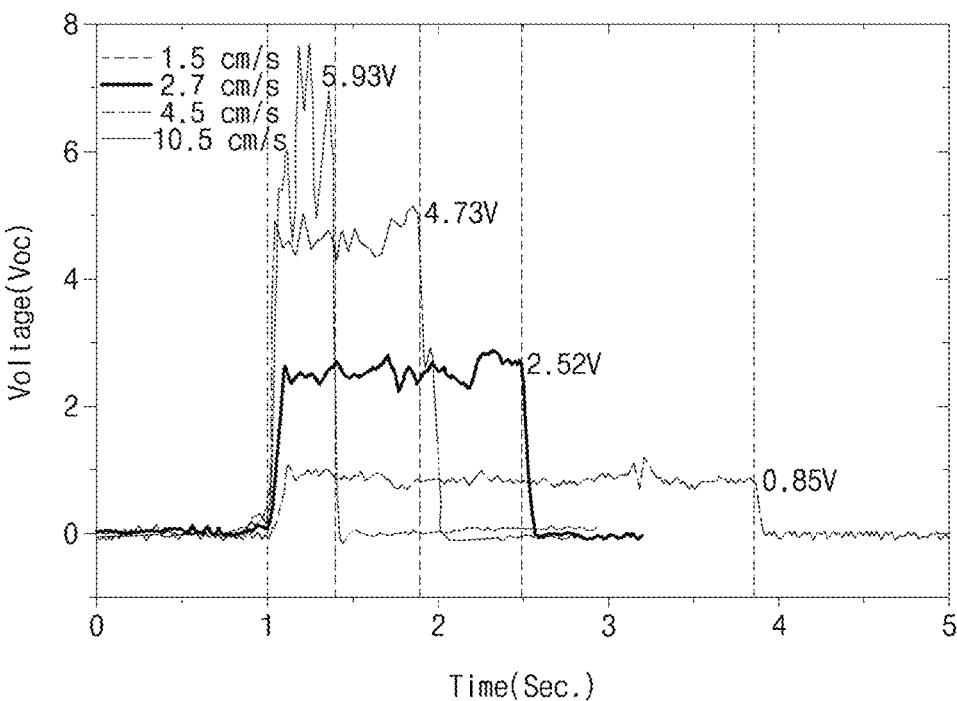
FIG. 7A is a graph illustrating a change in time-varying output voltage depending on the moving speed of the upper electrode of FIG. 6.
Figure 7B:
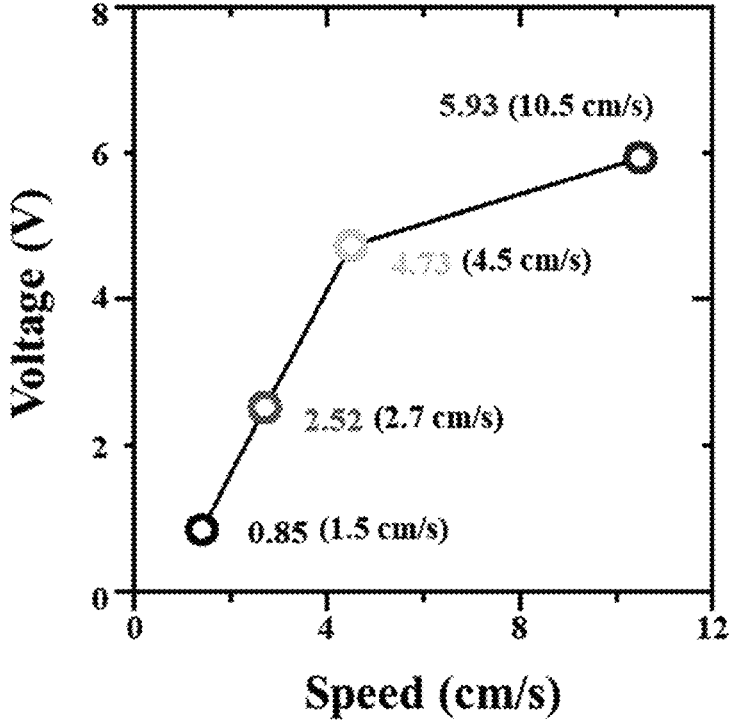
FIG. 7B is a graph illustrating a change in output voltage depending on the moving speed of the upper electrode of FIG. 6.
Figure 8:
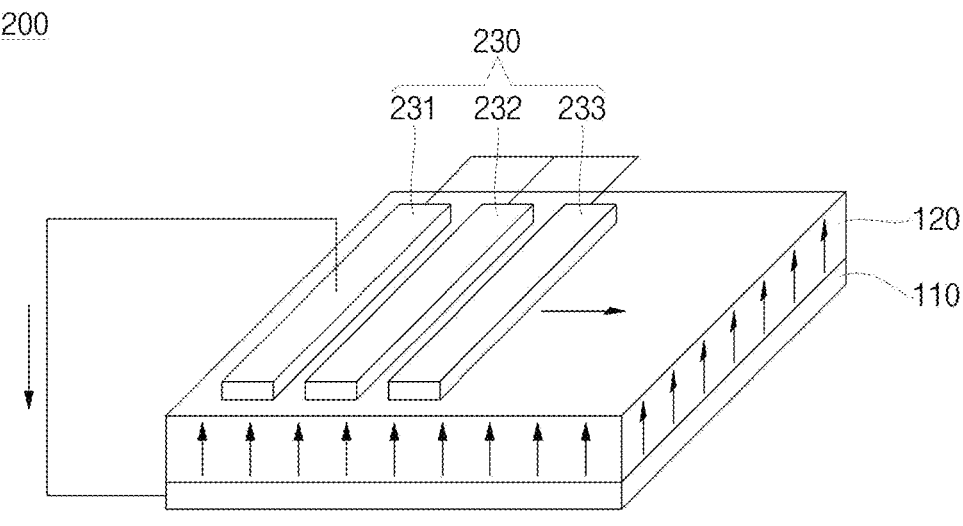
FIG. 8 is a schematic perspective view of a piezoelectric direct current generator according to another embodiment.

FIG. 6 is a perspective view and a table of experimental conditions, which briefly illustrate an operation embodiment depending on a moving speed of the upper electrode in the piezoelectric direct current generator of FIG. 1. FIG. 7A is a graph illustrating a change in time-varying output voltage depending on the moving speed of the upper electrode of FIG. 6. FIG. 7B is a graph illustrating a change in output voltage depending on the moving speed of the upper electrode of FIG. 6. FIG. 8 is a schematic perspective view of a piezoelectric direct current generator according to another embodiment.

In more detail, a piezoelectric material layer 120 made of PZT having a thickness of about 200 μm is formed on a lower electrode 110 defining a front surface using Ag, and an upper electrode made of Al with a width of about 1 cm×2 cm is swept on the piezoelectric material layer 120 at speeds of about 1.5 cm/s, about 2.7 cm/s, about 4.5 cm/s, about 10.5 cm/s while applying a pressure of about 20 N to the upper electrode 130. Here, a voltage obtained according to a moving speed y of the upper electrode 130 is compared. Referring to FIGS. 7A and 7B, it may be seen that as the speed y of the upper electrode 130 increases, a higher voltage is induced. In addition, it may be seen that magnitude of an output voltage increases almost in proportion to the speed y of the upper electrode 130. That is, as in the previous test results, it may be seen that the larger an area swept by the upper electrode 130 per hour, the greater the output is generated.

Thus, it may be seen that the output of the piezoelectric direct current generator 100 according to the present disclosure increases according to the area that the upper electrode 130 is swept over an upper portion of the piezoelectric material layer 120 per hour.

Hereinafter, a configuration of the piezoelectric direct current generator according to another embodiment will be described.

Configurations having the same or similar form and function as those of the previous embodiment are given the same reference numerals, and hereinafter, differences from the foregoing embodiment will be mainly described.

FIG. 8 is a schematic perspective view of a piezoelectric direct current generator according to another embodiment.

Referring to FIG. 8, a piezoelectric direct current generator 200 according to another embodiment may include a lower electrode 110, a piezoelectric material layer 120, and an upper electrode 230.

The upper electrode 230 is disposed on the piezoelectric material layer 120. A plurality of upper electrodes 230 may be disposed to increase in output instead of one, and the plurality of upper electrodes 230 may be electrically interconnected to each other.

According to this structure, when the upper electrode 230 moves over the piezoelectric material layer 120 once, it is possible to increase in total area over which the upper electrode 230 moves in proportion to the number of the upper electrodes 230. Thus, the piezoelectric direct current generator 200 according to another embodiment may be improved in power generation efficiency when compared to that of the piezoelectric DC generator 100 according to the foregoing embodiment.

Hereinafter, a configuration of a piezoelectric DC generator according to another embodiment of the present invention will be described.

Figure 9:
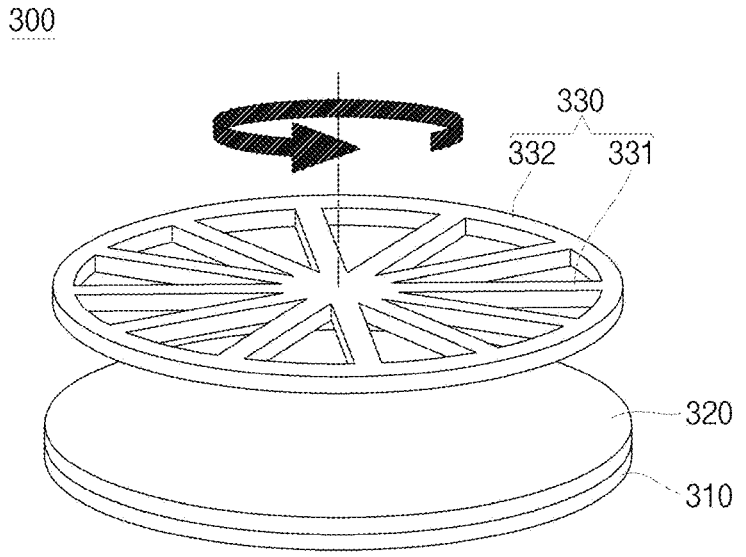
FIG. 9 is a schematic perspective view of a piezoelectric direct current generator according to further another embodiment.

FIG. 9 is a schematic perspective view of a piezoelectric direct current generator according to further another embodiment.

Referring to FIG. 9, a piezoelectric DC generator 300 according to further another embodiment of the present invention may include a lower electrode 310, a piezoelectric material layer 320, and an upper electrode 330.

Here, each of the lower electrode 310 and the piezoelectric material layer 320 may be provided in a circular plate shape, and the configuration other than the shape may be the same as in the foregoing embodiment.

The upper electrode 330 may rotate on a top surface of the piezoelectric material layer 320 with respect to an axis indicated by a dotted line in FIG. 9. Here, the upper electrode 330 may also rotate while pressing the top surface of the piezoelectric material layer 320 at a predetermined pressure. In addition, the upper electrode 330 may include a rotating part 331 constituted by a plurality of wheels disposed at a predetermined angle with respect to the axis and a circular edge part 332 for fixing an edge of the rotating part 331. Thus, as the upper electrode 330 rotates on the top surface of the piezoelectric material layer 320, the plurality of wheels constituting the rotating part 331 moves on the top surface of the piezoelectric material layer 320 at the same angular velocity. Thus, since the plurality of wheels constituting the rotating part 331 move while pressing the top surface of the piezoelectric material layer 320 through one rotation operation, efficiency of generated energy may be improved.

Hereinafter, a configuration of a piezoelectric DC generator according to another embodiment of the present invention will be described.

Figure 10:
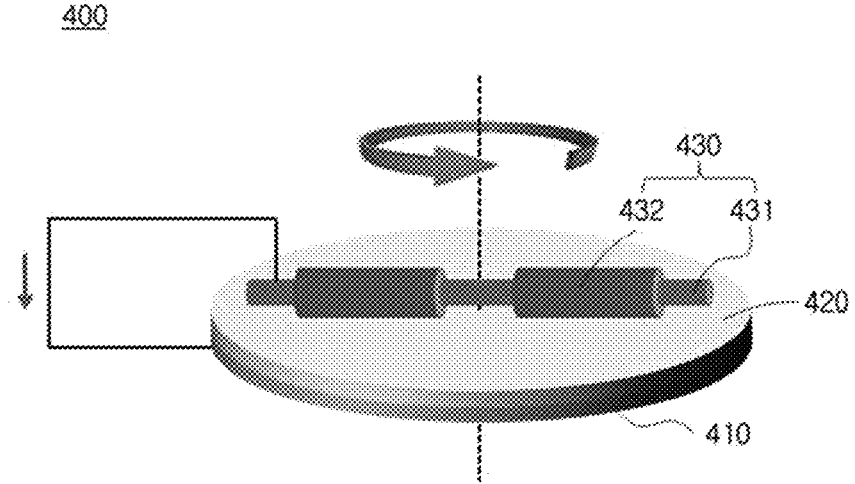
FIG. 10 is a schematic perspective view of a piezoelectric direct current generator according to further another embodiment.

FIG. 10 is a schematic perspective view of a piezoelectric direct current generator according to further another embodiment.

Referring to FIG. 10, a piezoelectric DC generator 400 according to further another embodiment of the present invention may include a lower electrode 410, a piezoelectric material layer 420, and an upper electrode 430.

Here, each of the lower electrode 410 and the piezoelectric material layer 420 may be provided in a circular plate shape, and the configuration other than the shape may be the same as in foregoing another embodiment.

The upper electrode 430 may rotate on a top surface of the piezoelectric material layer 420 with respect to an axis indicated by a dotted line in FIG. 10. Here, the upper electrode 430 may also rotate while pressing the top surface of the piezoelectric material layer 420 at a predetermined pressure. In addition, the upper electrode 430 may include a rotating part 432 including a bearing constituting at least one wheel disposed at a predetermined angle with respect to the axis and a wheel part 431 rotating to be in contact with the rotating part 432. Thus, as the upper electrode 430 rotates on the top surface of the piezoelectric material layer 420, the rotating part 432 including the bearing rolls to move the top surface of the piezoelectric material layer 420 without friction. Each of the rotating part 432 and the wheel part 431 may be made of a conductor such as a metal, and the rotating part 432 and the wheel part 431 may be electrically connected to each other by a metal bearing to serve as the upper electrode, like the foregoing embodiment. Therefore, since the top surface of the piezoelectric material layer 420 is pressed while moving without the friction through one rotation operation, the wear limitation caused by the friction between the upper electrode 430 and the piezoelectric material layer 420 may be solved.

According to the embodiment, the direct current may be directly generated from the mechanical energy using the piezoelectric effect. Therefore, when the energy generation principle and apparatus according to the present disclosure are applied, the direct current may be generated more efficiently in the small-scale or micro-energy power generation because there is no loss that occurs in the process of the direct current conversion through the rectifier circuit.

In addition, in the piezoelectric direct current generator according to the embodiment, since the (+, −) direction of the current is determined according to the polarization direction of the piezoelectric material, the direct current having the same polarity may be continuously generated regardless of the rotation of the generator or the moving direction of the upper electrode. As a result, the scope of application may be determined to be endless over the industries such as the renewable energy/environment/electric vehicle/IoT, and if this study is successful, the industrial and economic ripple effect may be expected to be significant.

Effects to be obtained by the present invention are not limited to the aforementioned effects, and unmentioned effects will be clearly understood by those skilled in the art from the specification and the appended claims.

The above-mentioned embodiment is merely an embodiment of the piezoelectric direct current generator, and thus, the present invention is not limited to the foregoing embodiment, and also it will be understood by those of ordinary skill in the art that various changes in form and details may be made therein without departing from the spirit and scope of the present invention as defined by the following claims.

What is claimed is:

1. A piezoelectric direct current generator comprising:
a first electrode;
a polarized piezoelectric material layer disposed on a first surface of the first electrode; and
a second electrode disposed on a surface opposite to the first electrode and coupled to move along the surface of the piezoelectric material layer while pressing the piezoelectric material layer.

2. The piezoelectric direct current generator of claim 1, wherein the second electrode is provided to have an area less than that of the piezoelectric material layer.

3. The piezoelectric direct current generator of claim 1, wherein at least a partial area of the second electrode is disposed to be in contact with the piezoelectric material layer.

4. The piezoelectric direct current generator of claim 1, further comprising an abrasion-resistant layer disposed between the piezoelectric material layer and the second electrode.

5. The piezoelectric direct current generator of claim 1, wherein the second electrode is provided in plurality.

6. The piezoelectric direct current generator of claim 5, wherein each of the second electrodes is configured to move while pressing different areas of the piezoelectric material layer.

7. The piezoelectric direct current generator of claim 5, wherein each of the second electrodes is configured to rotate on a top surface of the piezoelectric material layer with respect to an axis that is defined in a direction perpendicular to the top surface of the piezoelectric material layer.

8. The piezoelectric direct current generator of claim 7, wherein the second electrode comprises a rotating part comprising a plurality of wheels arranged in a preset angle with respect to the axis.

9. The piezoelectric direct current generator of claim 8, further comprising a ring-shaped edge part coupled to an edge of the rotating part.

10. The piezoelectric direct current generator of claim 8, wherein the plurality of wheels of the rotating part rotate along the top surface at the same angular velocity.

11. The piezoelectric direct current generator of claim 8, wherein each of the plurality of wheels of the rotating part comprises a bearing to rotate while rolled along the top surface.

12. The piezoelectric direct current generator of claim 1, wherein the first electrode and the polarized piezoelectric material layer are stacked in a first direction, and the second electrode is configured to move relative to the first electrode in a second direction perpendicular to the first direction.

13. The piezoelectric direct current generator of claim 1, wherein the polarized piezoelectric material layer has polarization characteristics in a first direction, and the second electrode is configured to move in a second direction perpendicular to the first direction.

* * * * *